(12) United States Patent
Flaherty et al.

(10) Patent No.: US 8,887,981 B2
(45) Date of Patent: Nov. 18, 2014

(54) TEMPORARY ADHESIVE FOR COMPONENT BONDING

(71) Applicant: Raytheon Company, Waltham, MA (US)

(72) Inventors: Luke M. Flaherty, Long Beach, CA (US); Randal E. Knar, Westminster, CA (US); Tiffanie T. Randall, San Pedro, CA (US)

( * ) Notice: Subject to any disclaimer, the term of this patent is extended or adjusted under 35 U.S.C. 154(b) by 0 days.

(21) Appl. No.: 13/831,594

(22) Filed: Mar. 15, 2013

(65) Prior Publication Data

US 2014/0263580 A1 Sep. 18, 2014

(51) Int. Cl.
- B23K 31/02 (2006.01)
- B23K 35/36 (2006.01)
- B23K 1/20 (2006.01)

(52) U.S. Cl.
CPC ............. *B23K 35/3613* (2013.01); *B23K 1/20* (2013.01); *B23K 35/3617* (2013.01)
USPC ........ 228/179.1; 238/207; 238/214; 238/223; 530/210

(58) Field of Classification Search
None
See application file for complete search history.

(56) References Cited

U.S. PATENT DOCUMENTS

| | | | |
|---|---|---|---|
| 3,232,895 A | 2/1966 | Klein et al. | |
| 3,266,949 A | 8/1966 | Groves et al. | |
| 3,448,512 A | 6/1969 | Saba | |
| 3,575,738 A | 4/1971 | Becker | |
| 3,708,448 A | 1/1973 | Ippolito et al. | |
| 3,730,782 A | 5/1973 | Poliak et al. | |
| 3,762,965 A | 10/1973 | Amin et al. | |
| 3,895,973 A * | 7/1975 | Stayner | 148/25 |
| 3,915,729 A | 10/1975 | Eustice | |
| 3,963,529 A | 6/1976 | Tsunashima | |
| 4,000,016 A | 12/1976 | Lazzarini et al. | |
| 4,284,703 A * | 8/1981 | Inoue et al. | 430/142 |
| 4,290,824 A | 9/1981 | Cole | |
| 4,396,700 A * | 8/1983 | Kitajima et al. | 430/254 |
| 4,441,938 A | 4/1984 | Poliak et al. | |
| 4,938,506 A * | 7/1990 | Matsuguchi et al. | 283/105 |
| 4,948,032 A * | 8/1990 | Dunaway et al. | 228/223 |
| 4,994,119 A | 2/1991 | Gutierrez et al. | |
| 5,009,724 A | 4/1991 | Dodd et al. | |
| 5,064,482 A | 11/1991 | Goobich et al. | |
| 5,141,568 A | 8/1992 | Turner et al. | |
| 5,176,749 A | 1/1993 | Costello et al. | |
| 5,176,759 A * | 1/1993 | Taguchi | 148/24 |
| 5,211,763 A | 5/1993 | Takemoto et al. | |
| 5,378,920 A * | 1/1995 | Nakagawa et al. | 257/487 |
| 5,452,840 A | 9/1995 | Turner | |
| 5,464,477 A * | 11/1995 | Awad | 134/1 |
| 5,549,761 A | 8/1996 | Winston et al. | |
| 5,631,318 A * | 5/1997 | Ito et al. | 524/590 |
| 5,728,230 A * | 3/1998 | Komori et al. | 136/251 |
| 5,938,856 A | 8/1999 | Sachdev et al. | |
| 6,070,789 A * | 6/2000 | Conn et al. | 228/224 |
| 6,346,334 B1 * | 2/2002 | Kamitani | 428/521 |
| 6,599,372 B2 | 7/2003 | Arora et al. | |
| 6,800,141 B2 | 10/2004 | Sachdev et al. | |
| 7,956,114 B2 * | 6/2011 | Flaherty et al. | 524/270 |
| 2002/0033557 A1 * | 3/2002 | Hashimura et al. | 264/315 |
| 2005/0023328 A1 * | 2/2005 | Stipp et al. | 228/207 |
| 2005/0067468 A1 * | 3/2005 | Lu et al. | 228/207 |
| 2007/0102481 A1 * | 5/2007 | Kato et al. | 228/101 |
| 2007/0186997 A1 | 8/2007 | Ikeda et al. | |
| 2007/0218374 A1 * | 9/2007 | Kitano et al. | 430/14 |
| 2008/0053571 A1 | 3/2008 | Yamamoto et al. | |
| 2008/0053572 A1 | 3/2008 | Sanji et al. | |
| 2010/0007018 A1 * | 1/2010 | Wyatt et al. | 257/737 |
| 2010/0009150 A1 * | 1/2010 | Mitooka et al. | 428/220 |
| 2010/0224673 A1 | 9/2010 | Flaherty et al. | |
| 2011/0091708 A1 * | 4/2011 | Noda et al. | 428/220 |
| 2011/0296952 A1 * | 12/2011 | Kay et al. | 75/392 |
| 2012/0114953 A1 * | 5/2012 | Ogawa et al. | 428/423.1 |
| 2012/0181295 A1 * | 7/2012 | Sasaki | 220/789 |
| 2012/0190786 A1 * | 7/2012 | Sasaki | 524/505 |
| 2013/0092235 A1 * | 4/2013 | Tanaka et al. | 136/259 |
| 2014/0011012 A1 * | 1/2014 | Noda et al. | 428/220 |

FOREIGN PATENT DOCUMENTS

| | | |
|---|---|---|
| EP | 0 619 162 A2 | 10/1994 |
| EP | 1 897 652 A1 | 3/2008 |
| EP | 2 090 622 A2 | 8/2009 |
| JP | 55-094206 A * | 7/1980 |
| JP | 60-072969 A * | 4/1985 |
| WO | WO 01/39922 A1 | 6/2001 |

OTHER PUBLICATIONS

Greene, Stephen et al. (ICOLP Technical Committee); "Aqueous and Semi-Aqueous Alternatives for CFC-113 and Methyl Chloroform Cleaning of Printed Circuit Board Assemblies"; May 1991 (revised Oct. 1994 by Andersen et al.); 97pp.
Tech Chem, AXAREL 32 product sheet, 2009, 2pp.
International Search Report and Written Opinion for PCT Application No. PCT/US2014/011735, mailed Apr. 4, 2014, 10pp.
International Search Report and Written Opinion for PCT Application No. PCT/US2014/011740, mailed Apr. 10, 2014, 11pp.

* cited by examiner

*Primary Examiner* — Kiley Stoner

(57) ABSTRACT

A rosin composition includes a gum rosin, an emulsifier, a randomizing additive and a bonding agent. This rosin composition may be used as a temporary or permanent adhesive for the soldering of components. The rosin composition may be temporary as it is easily removed from a surface without damaging the surface.

54 Claims, 15 Drawing Sheets
(15 of 15 Drawing Sheet(s) Filed in Color)

TEMPORARY ADHESIVE FOR COMPONENT BONDING

TECHNICAL FIELD

The invention is directed to gum rosin compositions and adhesives including gum rosin compositions.

BACKGROUND

Adhesives that are used in circuit card (CC) manufacturing are mostly used as either low coefficient of thermal expansion (CTE) epoxies or quick cure acrylics. These adhesives, when bonded onto a CC, effectively secure electronic components. However, when a bonded component fails, replacement of the component often causes the soldering pad of the assembly to lift, and the assembly is subsequently scrapped. Similarly, if a component configuration change is required and assemblies have been bonded, the loss of an assembly often occurs because the rework procedures are the same as replacing a had device. To address this issue, some manufacturers have implemented replaceable adhesives to reduce the scrapping of an assembly. However, both replaceable and permanent adhesives have disadvantages when either of these adhesives is placed on a circuit card assembly soldering pad. A smaller pad increases the probability of placing adhesive on a soldering pad, resulting in contamination of the pad. Considering the industry has been driven to very small parts (e.g., 2 mm by 1 mm) and thin line trace spacing (e.g., 5 mils), the possibility of contaminating the soldering pad is significantly high.

Accordingly, an easily removable and/or solderable adhesive is desired to improve the manufacturing of circuit card assemblies and printed wiring boards.

SUMMARY in some embodiments of the present invention, a rosin composition includes a gum rosin, an emulsifier, a randomizing additive, and a bonding agent. The bonding agent may include polyvinyl acetate. This rosin composition may also include a filler. The gum rosin may be water white gum rosin. The emulsifier may be either solvent-based or semi-aqueous, and may include polyvinyl alcohol. The randomizing additive may be selected from hydrocarbon oils, naturally occurring oils, glycerols, and combinations thereof.

In other embodiments of the present invention, a method of soldering components on a printed circuit board is provided, the method including applying a rosin composition including a gum rosin, an emulsifier, a randomizing additive, and a bonding agent onto a substrate of a printed wiring board; soldering at least one component to the substrate of the printed wiring board, and removing the rosin composition from the printed wiring board using a soap solution or an organic solvent.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other features and advantages of the present invention will be better understood by reference to the following detailed description when considered in conjunction with the accompanying drawings, wherein.

DETAILED DESCRIPTION

Figure 1:
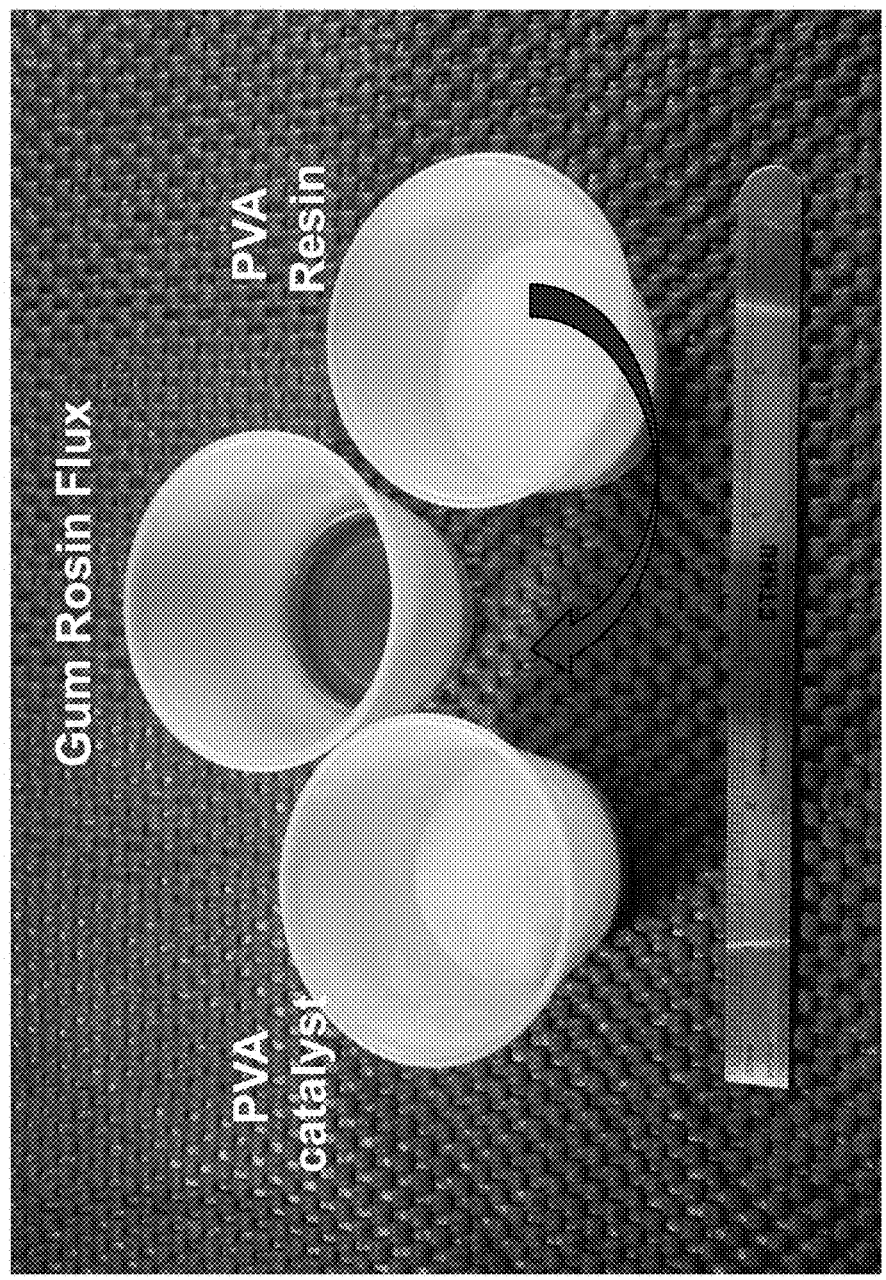
FIG. 1 is a photograph of a gum rosin composition, polyvinyl alcohol (PVA) resin and PVA catalyst, according to embodiments of the present invention.

In some embodiments of the present invention, a gum rosin composition is provided that is effectively and easily removed. A gum rosin composition according to embodiments of the present invention includes a gum rosin, an emulsifier, a randomizing additive, and a bonding agent. A gum rosin composition according to some embodiments of the present invention is a water immiscible flux base composition used as an adhesive for bonding components to printed wiring boards (PWBs). This gum rosin adhesive can be permanent or temporary, and is easily removable.

In some embodiments, examples of gum rosins include, but are not limited to, gum rosins having the following grades: N, X, XX, W-G, and W-W. Gum rosins are available from a variety of companies, including but not limited to Alfa Aesar, Ward Hill, Mass., USA: Arizona Chemical Company, Pensacola, Fla., USA; Mead Westvaco, Richmond, Va., USA; GEA Barr-Rosin, Maidenhead Berkshire, UK; Cray Valley HSC, Paris La Defense Cedex, France; Jai Bharat Resin and Chemical, Rishikesh, India; Balram Sri Krisna Overseas, Amritsar (Punjab), India; Shanghai Xiaoxiang Chemical Company, Shanghai, China; Shanghai Polymet Commodities, Ltd., Shanghai, China; Dalian Chemical Import and Export Group Company, Dalian City (Liaoning Prov.), China; Fuzhou Farwell Import and Export Company, Fuzhou, China; Guangxi Qinzhou Capital Success Chemical Company, Qinzhou City, China; and Roveda Ind. Quim Ltda, Santa Catarina, Brazil.

In some embodiments, the gum rosin is water white gum rosin.

An emulsifier according to embodiments of the present invention includes solvent-based emulsifiers and semi-aqueous emulsifiers. Examples of solvent emulsifiers include, but are not limited to, trichloroethane, acetone isopropyl alcohol (IPA), IPA-water combination, toluene, benzene, 2-propanol (IPA), methyl ethyl ketone (MEK), toluene/acetone/methyl ethyl ketone (MEK) and IPA combination, 1,1-dichloroethane, isoamyl acetate, cellusolve acetate, acetone, xylene, 1,1,1,1-tetrachloromethane, 1,1,2,2-tetrachloroethene, 1,1,1-trichloroethane, 1,1,2-trichloroethane, 1,1-dichloroethane, 1,1-dichloroethene, 1,2-dichloroethane, 1,2,-dichloroethene, 1,1-dichloro-1-bromoethane, 1,1-dichloro-1-bromoethene, 1-bromo-1 chloro-2-chloroethene, 1,1,1-tribromoethane, 1,1,2-tribromoethene, and combinations thereof.

Examples of semi-aqueous emulsifiers include, but are not limited to, ethylene glycol in water, diethylene glycol in water, polyethylene glycol (PEG) in water, polyethylene diglycol in water, terpene-based organic compounds in water, organic sulfate compounds in water, and combinations thereof. Non-limiting examples of organic sulfate compounds include dimethyl sulfoxide, diethyl sulfoxide, sodium methylsulfinylmethylide, trimethylsulfonium iodide, dimethylsulfoniopropionate, and methylsulfonylmethane in an emulsion of isopropyl alcohol and water.

In some embodiments, a semi-aqueous emulsifier includes polyethylene glycol (PEG). If the carbon chain of the PEG is buttressed where the addition group is attached (multifunctional glycols), then solvency of the higher molecular weight constituents may not form emulsions. In some embodiments, a semi-aqueous emulsifier includes PEG having a molecular weight of about 5,000 daltons or less. In some embodiments, a semi-aqueous emulsifier includes PEG having a molecular weight of about 3,000 daltons or less. In some embodiments, a semi-aqueous emulsifier includes PEG having a molecular weight of 2,000 daltons or less. In some embodiments, a semi-aqueous emulsifier is an adipate derivative of PEG.

Examples of polyethylene diglycols for use as a semi-aqueous emulsifier include, but are not limited to, methyl diglycol, ethyl diglycol, diethylene glycol dibutyl ether, butyl diglycol, glycol butyl ether, allyl diglycol, and combinations thereof.

In some embodiments, a semi-aqueous emulsifier includes terpenes. Terpene chemistry is known to work as a semi-aqueous cleaning solvent based on methyl buta-1, 3 diene (hemiterpene $C_5H8$). A terpene compound in solutions of warm water dissolve the polymerization product of water immiscible fluxes at concentrations as low as 5 percent. Additionally, monoterpenes (C10H16) sesquiterpenes (C15H24); diterpenes (C20H32) sesterpenes (C25H40); and triterpenes (C30.H48) in solution will dissolve the polymerization product of water immiscible fluxes. Phosphate substitutions of the isoprene also dissolve the polymerization product of water immiscible fluxes. A non-limiting example of a terpene phosphate is isopentenyl pyrophosphate ($C_5H_{12}O_7P_2$). Commercially available products of terpene (isoprene)-based cleaning solutions include: Bioact EC7R, Bioact EC7M, Axarel 36, Pinsol, Citraflor EG3, Citraflor EGS, Citraflor EGX, d-limonene FG, and d-limonene HG.

In some embodiments, a randomizing additive includes, but is not limited to, hydrocarbon oils, naturally occurring oils, and glycols. Examples of hydrocarbon oils include, but are not limited to, castor bean oil, corn oil, grape seed oil, olive oil, peanut oil, soybean oil, sunflower seed oil, walnut oil, avocado oil, flax seed oil, and combinations thereof. Examples of naturally occurring oils, include, but are not limited to, glycerin, hemp oil, jojoba oil, lanolin, tea tree oil, and wheat germ oil. Examples of glycols include, but are not limited to, polyethylene glycols (PEG), ethylene adipates, benzo-alkyl diols, and combinations thereof.

In some embodiments, a single randomizing additive may be used with the gum rosin and emulsifier. In other embodiments, however, combinations of at least two additives may be used. For example, a combination of two or more additives from the same group may be used, such as two or more hydrocarbon oils. Alternatively, in some embodiments, two or more additives from different groups may be used, such as one hydrocarbon oil and one naturally occurring oil, or one oil and one glycerol. Also, when the combination of additives includes two materials from the same group (e.g., two hydrocarbon oils), any mixing ratio may be used. Similarly, when the combination of additives includes at least two materials from different groups, any mixing ratio may be used. However, in some embodiments, when the combination includes a mixture of oils (either hydrocarbon or naturally occurring) and glycerols, the weight ratio of oil to glycerol ranges from about 5 to about 20% glycerol in oil. Longer chain oils (i.e., those having higher molecular weight) may be less effective at randomizing the terpine polymer, while branched chain hydrocarbons are less effective than linear hydrocarbons. Ratios of glycerol to oil resulting in greater than about 20% glycerol in the oil, negatively affect the performance of the gum rosin composition compared to using the hydrocarbon oil alone. In some embodiments, the randomizing additives are present in an amount from about 3% to about 45% when mixed with solubilized gum rosin (i.e., gum rosin mixed with an emulsifier).

In some embodiments, the gum rosin composition according to embodiments of the present invention includes a gum rosin, an emulsifier, a randomizing additive, and a filler. A filler may be added to increase the viscosity of the composition and make the composition more thixotropic. That is, after addition of the randomizing additive, a filler is added to the gum rosin composition from about 0.5% to 5%/o by weight. The filler may be a material that is either reactive or non-reactive to the polymer chemistry. Non-limiting examples of a reactive material filler include the addition of hydrated sodium borate, boric acid or succinic acid to the polyvinyl alcohol. Non-limiting examples of a non-reactive material filler include fumed silica (CAB-O-SIL®), cut glass fiber, aluminum oxide, fine powdered ceramics, non-conductive carbon nanotubes (CNT), carbon geodesic balls (Buckyballs or fullerenes), natural organic based fine nut shell particles (particles of nut shells), ablative cork, synthetic organic fine particles (finely ground nylon 66 or derivative), finely ground glass beads (silica dioxide), and inorganic non-reactive fine powders (potassium sulphate). In some embodiments, the filler used in the gum rosin adhesive composition is thermally stable up to about 240° C.

In some embodiments, a gum rosin adhesive composition includes a gum rosin, an emulsifier, a randomizing additive of the pseudo prepolymer gum rosin, and a bonding agent. In some embodiments, the solubilized gum rosin composition and randomizing additive is combined with a resin and polymer system bonding agent to form a gum rosin adhesive composition. Such a polymer system is made using inherent hydrolytic non-stable polymers or by modifying hydrolytic stable pre-polymer reactants with hydroxyl-cleavable polymer structures. Hydrolytic non-stable binding resins and polymers consist of classes of materials such as poly-dextrins $(C_6 H_{10} Os)_n$; polyvinyl alcohol $(C_2 H_4 O)_n$; polyacrylic acid $(C_3 H_4 O_2)_n$; phenol and acetic acid and water (PAW) (structure); and Polyox™ resin systems (Dow Chemical) Hydrolytic non-stable binding resin and polymer systems with hydroxyl cleavable polymer structures are created by reacting acrylic, acrylic modified urethanes, urea extended urethanes, and rubber modified epoxy/acyl substituted epoxy pre-polymers with a hydrophilic polyol structure, such as ethylene adipate. Other organic polymer pre-curser such as the malonic/maleic acid, esters, and malonic/maleic anhydrides can be used as the base binding resin or polymer systems.

In some embodiments, the bonding agent includes an organic solution soluble binding resin system and polymer. These organic solution soluble binding resin and polymer systems are made using similar methods as the hydrolytic non-stable binding resin and polymer systems with hydroxyl cleavable polymer structures as disclosed. However, the hydrolytic cleavable polymer structure is substituted with a solvent non-stable acrylic acid pre-polymer or an unstable modified urethane. An example of such a system includes incorporating a diglycol ester such as ethylenediol adipate. Examples of organic solutions that solvate polymer systems include: aromatics (e.g., benzene, toluene, xylene, and xanthene): aliphatics (e.g., acetone, methyl ethyl ketone): common alkanes (e.g., butane, dodecane): common alcohols (e.g., methanol and butyl dodecanol): and weak organic acetals (e.g., methyl acetate, isoamyl acetate).

In some embodiments, a gum rosin adhesive composition includes about 1 to 3 parts solubilized gum rosin and randomizing additive mixed with about 3 to 6 parts bonding agent. As disclosed, the bonding agent is a water-soluble material or a solvent-washable tacky material. In some embodiments, the bonding agent is capable of maintaining its properties after soldering at reflow temperatures of about 210 to about 240° C., with no depreciable amounts of polymer pyrolization.

Figure 2:
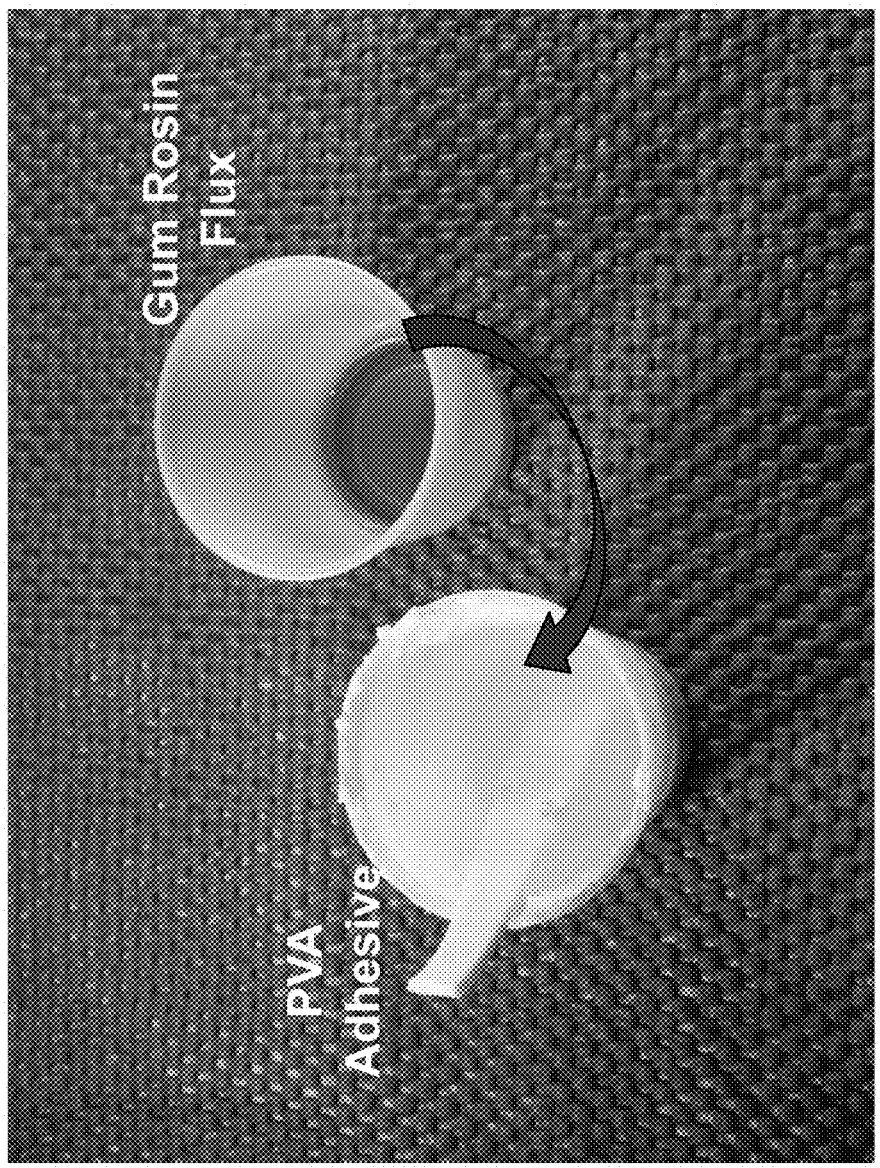
FIG. 2 is a photograph of a gum rosin composition and PVA adhesive, according to embodiments of the present invention.
Figure 3:
FIG. 3 is a photograph of a gum rosin composition in a mixture with PVA adhesive to form a gum rosin adhesive, according to embodiments of the present invention.

For example, in some embodiments, a gum rosin is dissolved in isopropyl alcohol (IPA) at about 65% gum rosin to 35% IPA. This gum rosin/IPA solution is stirred between about 23° to about 30° C. for up to about 3 hours. In some embodiments, about 1 part oil is added to about 9 parts white gum rosin/IPA solution to form a water immiscible flux mixture as shown in FIG. 1 center container and FIG. 2 right container, respectively. The adhesive resin and catalyst is formulated using about 0.5% or less of hydrated sodium borate (a filler) and is mixed into polyvinyl alcohol (binding agent) as shown in the left and right containers in FIG. 1. The final temporary adhesive is formulated by mixing about 8 parts of water immiscible flux to about 3 parts polyvinyl alcohol as demonstrated in FIGS. 2 and 3. The range of adhesive resin to water immiscible flux is from about 2 to about 1 parts by weight to about 1 parts to 7 parts by weight. Fillers as disclosed herein can be added to this adhesive composition.

In some embodiments, the temporary adhesive composition as disclosed herein is easily removed without damaging or compromising the application surface. Removal of the disclosed temporary adhesive composition may include cleaning with an aqueous solution or an organic solvent solution. In some embodiments, the temporary adhesive composition as disclosed herein is cleaned with a soapy water solution including an industrial detergent. Examples of an industrial detergent include Kyzen detergents, for example, Kyzen 4615 (Aquanox®, Kyzen Corp., Nashville, Tenn.).

The following Examples are presented for illustrative purposes only, and do not limit the scope or content of the present application.

Example

Water white gum rosin was dissolved in isopropyl alcohol (IPA) by stirring 65% water white gum rosin in 35% IPA at 23 to 30° C. for 3 hours. To 9 parts of this gum rosin/IPA mixture, 1 part of grape seed oil was added, followed by 0.5% hydrated sodium borate. 3 parts polyvinyl acetate (PVAc) or polyvinyl alcohol (PVA) was then added to 7 parts of the gum rosin/IPA/hydrated sodium borate mixture to form a water white gum rosin adhesive.

Figure 4:
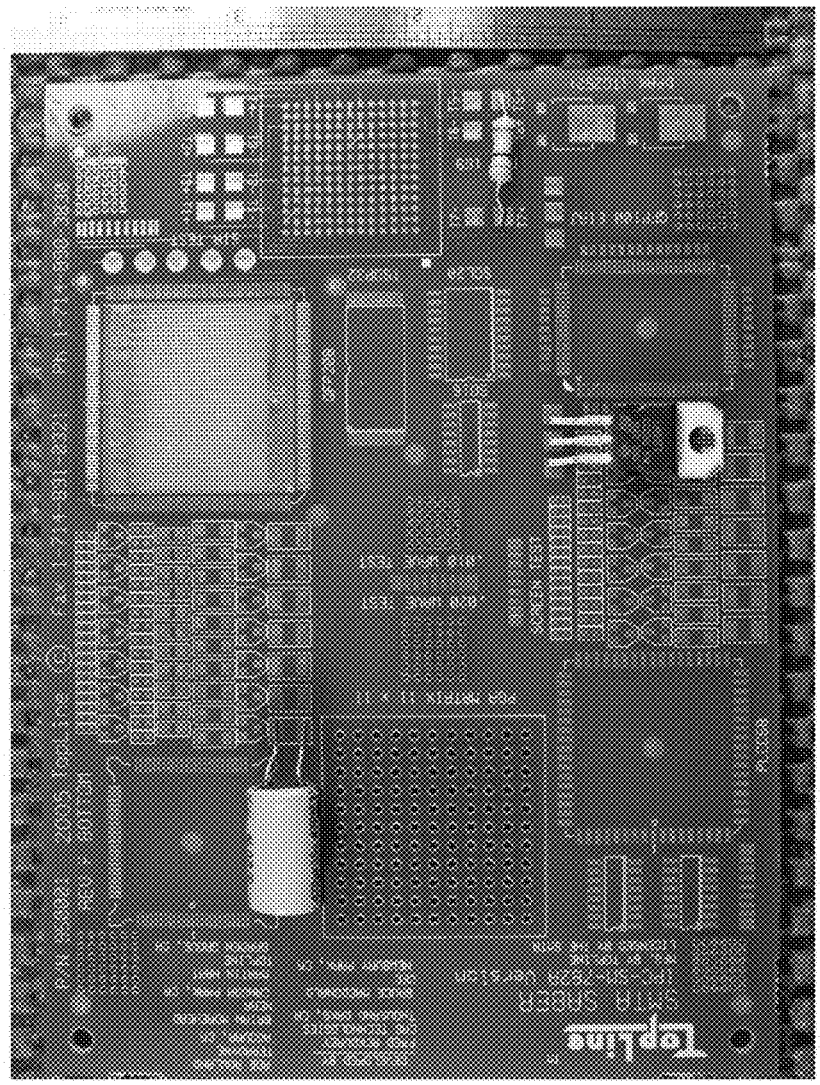
FIG. 4 is a photograph of a printed wiring board (PWB) and components before adhesive bonding and soldering, according to embodiments of the present invention.
Figure 5:
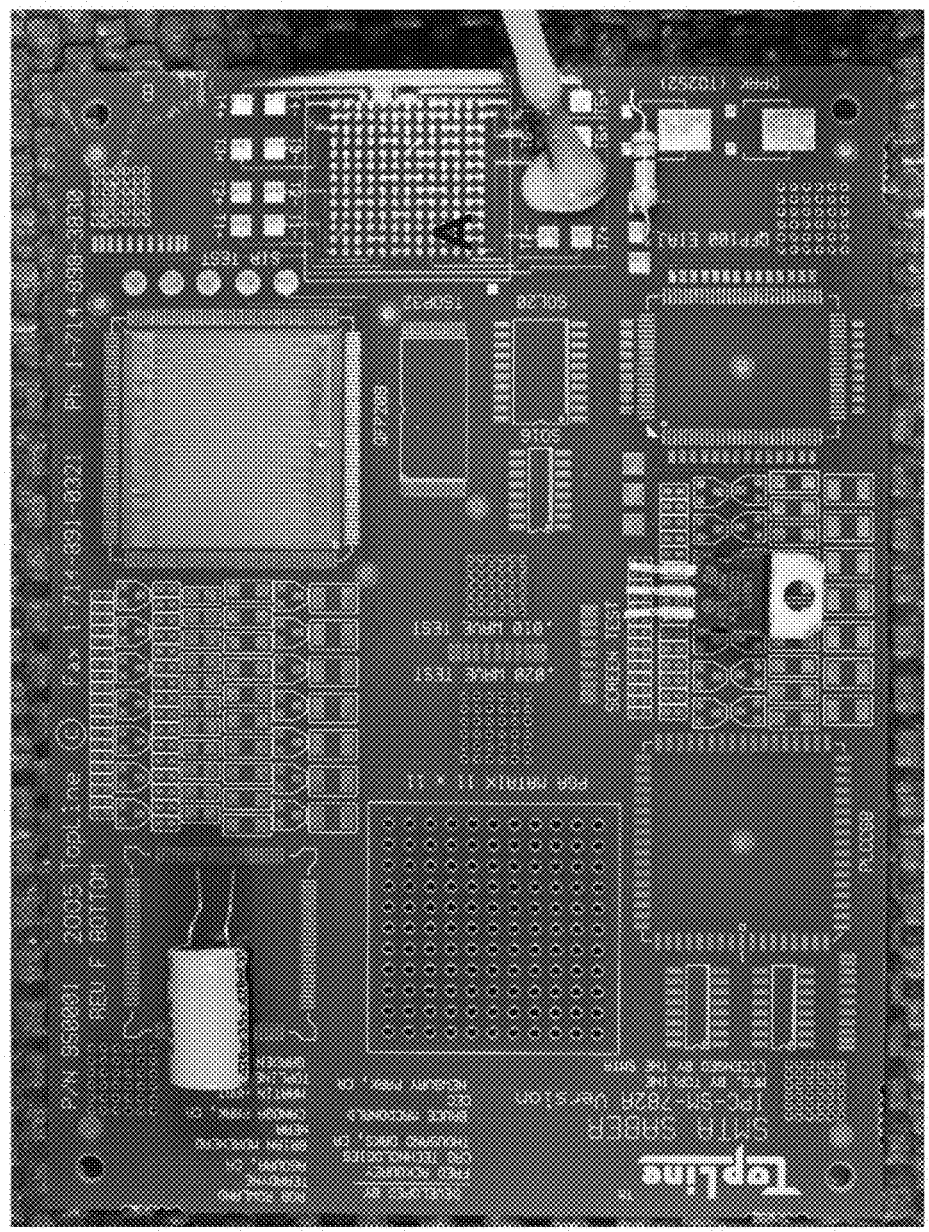
FIG. 5 is a photograph of the gum rosin adhesive composition shown in FIG. 3, being applied to a printed wiring board at position A, according to embodiments of the present invention.
Figure 6:
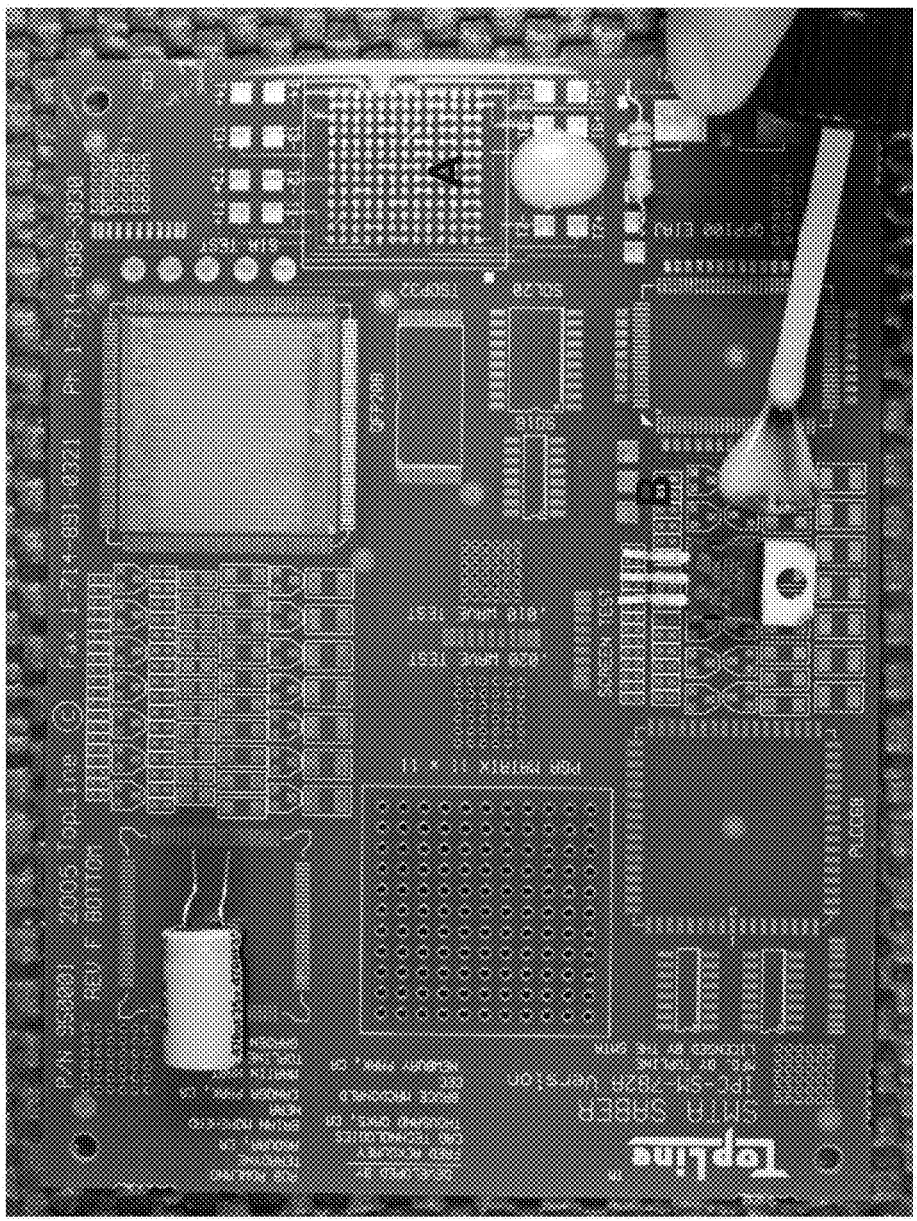
FIG. 6 is a photograph of the gum rosin adhesive composition shown in FIG. 3, being applied to a printed wiring board at position B, according to embodiments of the present invention.
Figure 7:
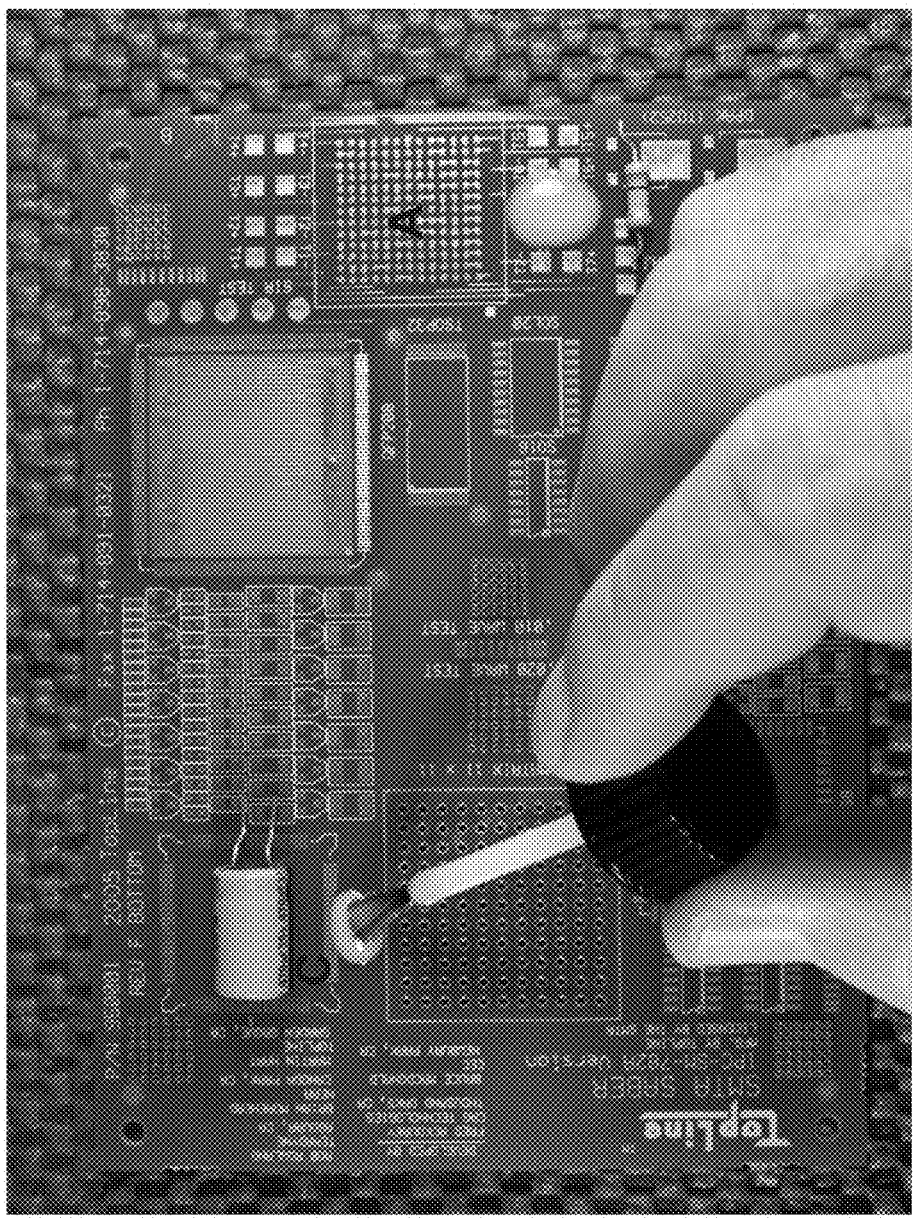
FIG. 7 is a photograph of the gum rosin adhesive composition shown in FIG. 3, being applied to a printed wiring board at position C, according to embodiments of the present invention.
Figure 8:
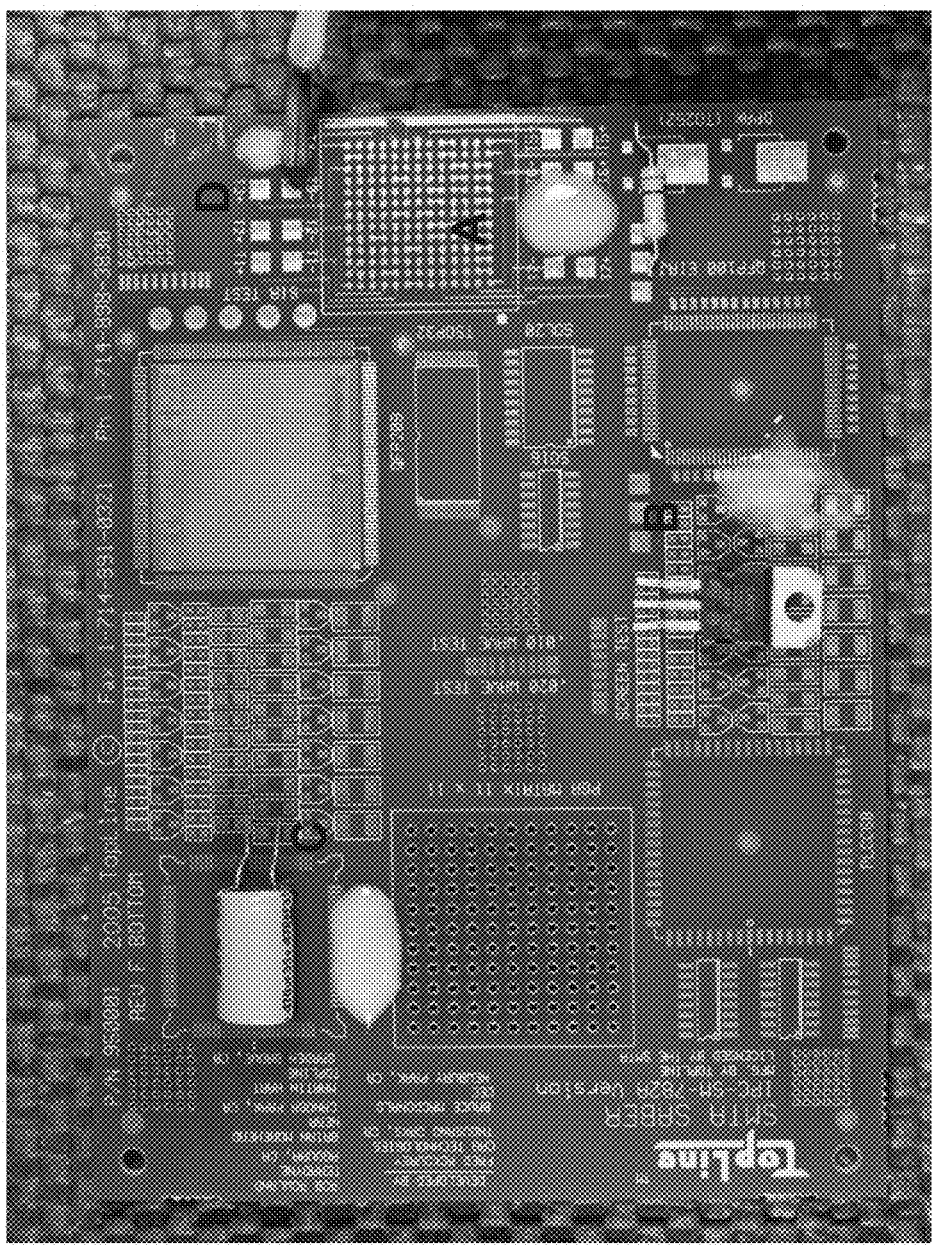
FIG. 8 is a photograph of the gum rosin adhesive composition shown in FIG. 3, being applied to a printed wiring board at position D, according to embodiments of the present invention.
Figure 9:
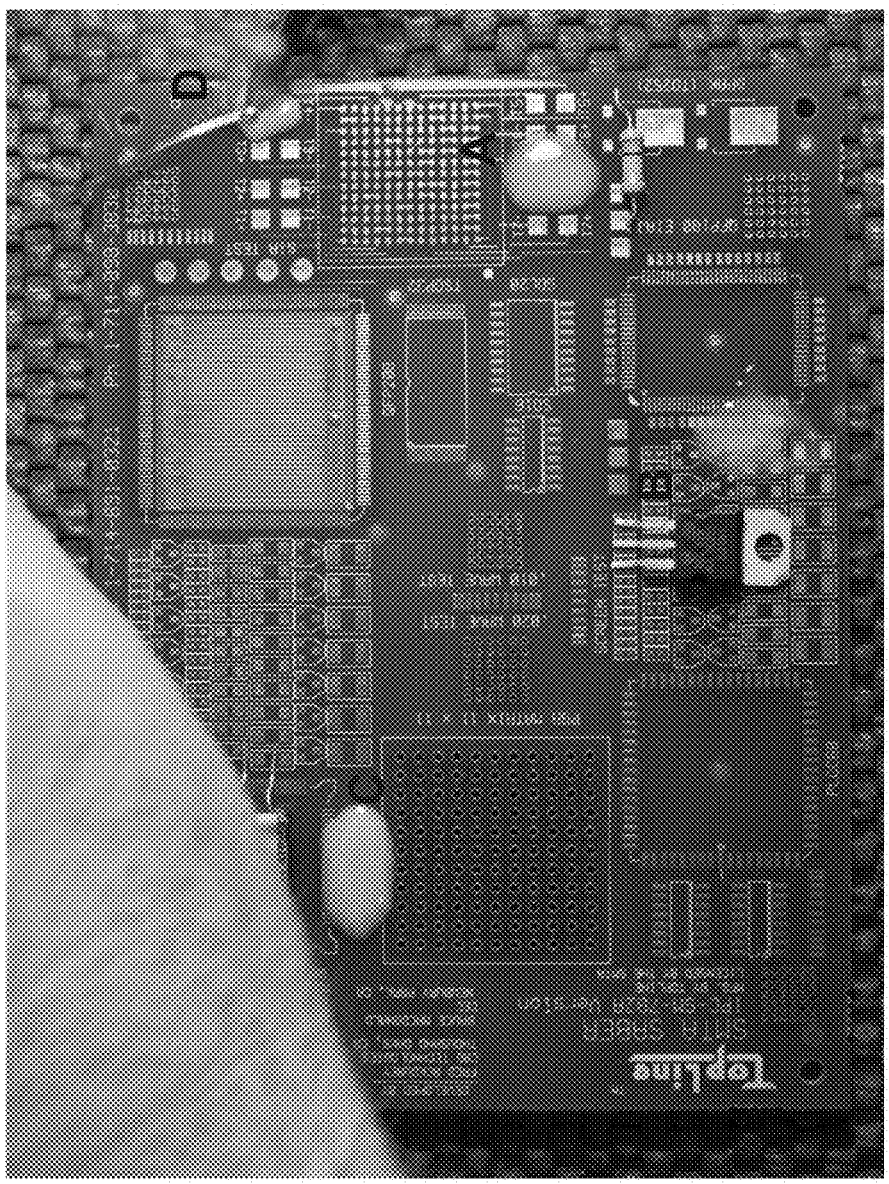
FIG. 9 is a photograph of the applied gum rosin adhesive composition of FIG. 16, being soldered on a printed wiring board at position D, according to embodiments of the present invention.
Figure 10:
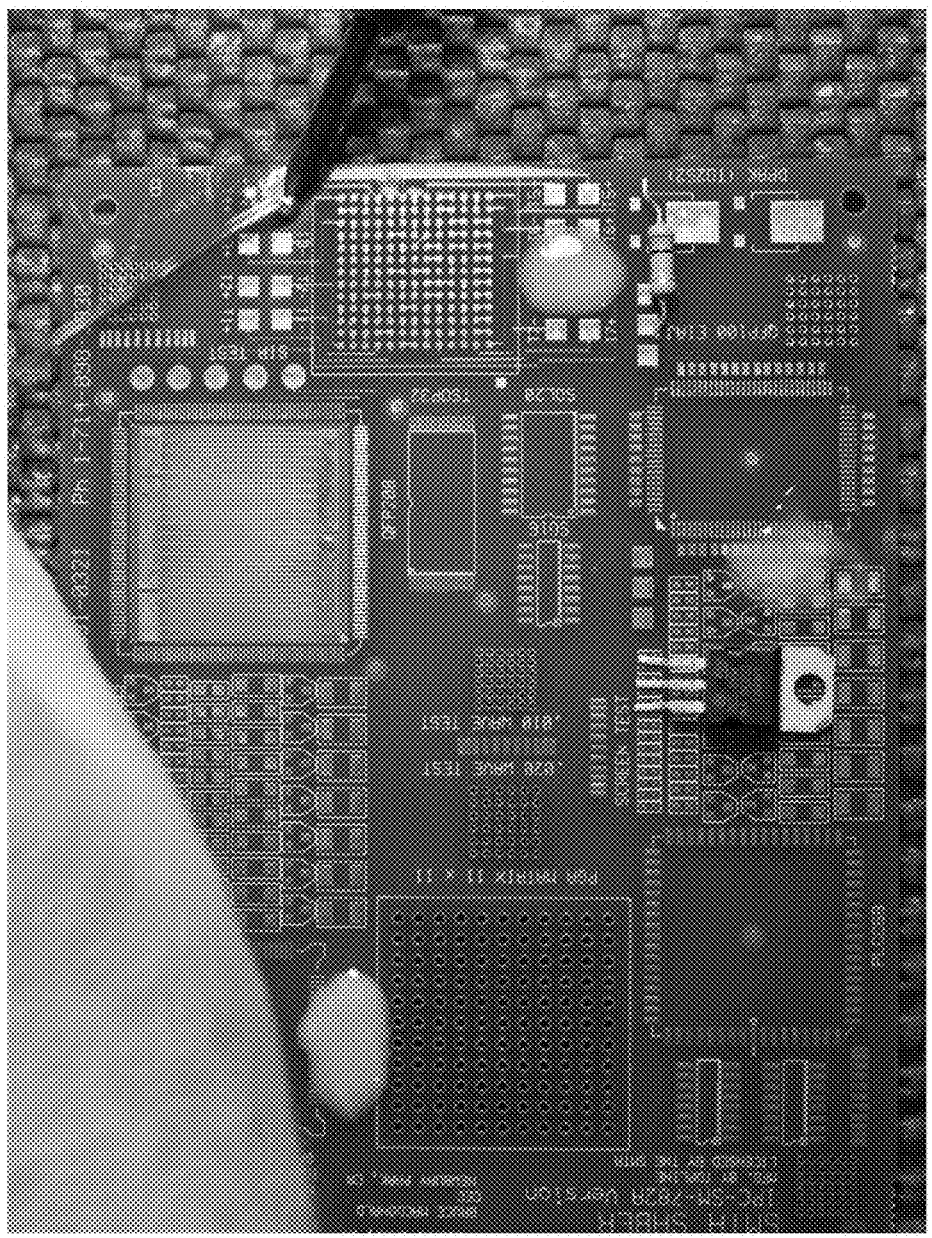
FIG. 10 is a photograph of the applied gum rosin adhesive composition of FIG. 16, being soldered on a printed wiring board at position D, according to embodiments of the present invention.
Figure 11:
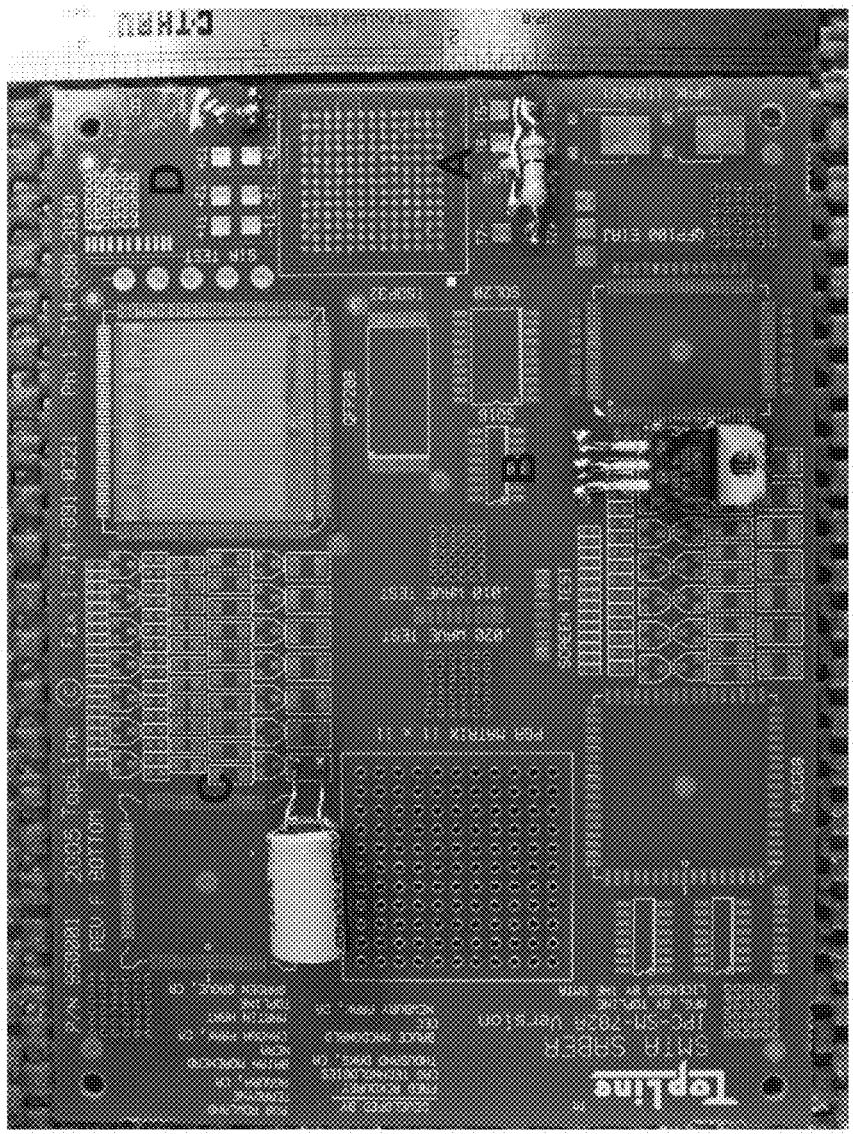
FIG. 11 is a photograph of soldered gum rosin adhesive compositions retaining components after soldering on a printed wiring board at positions A, B, C and D, according to embodiments of the present invention.
Figure 12:
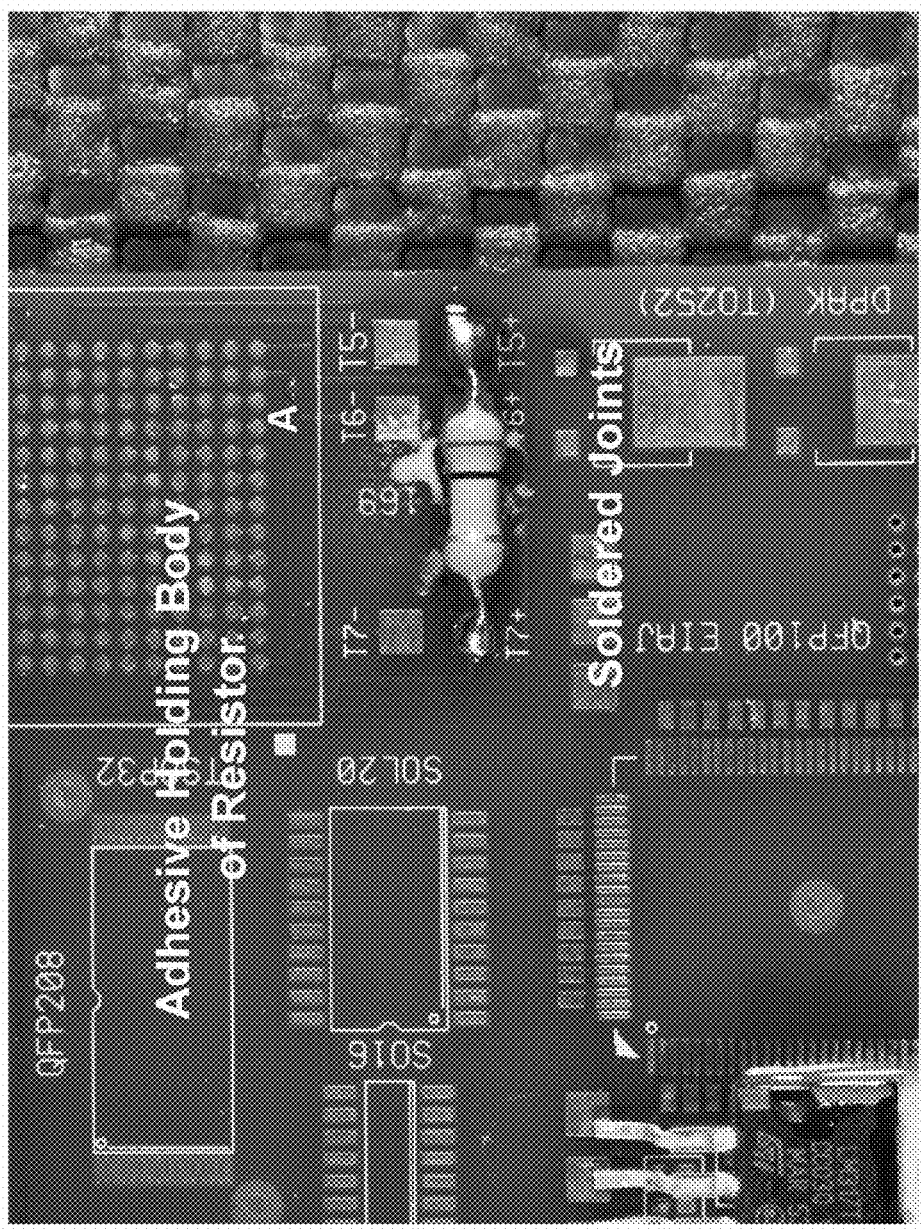
FIG. 12 is a close-up photograph of position A of FIG. 11 of a soldered gum rosin adhesive composition retaining the body of a resistor on a printed wiring board, according to embodiments of the present invention.
Figure 13:
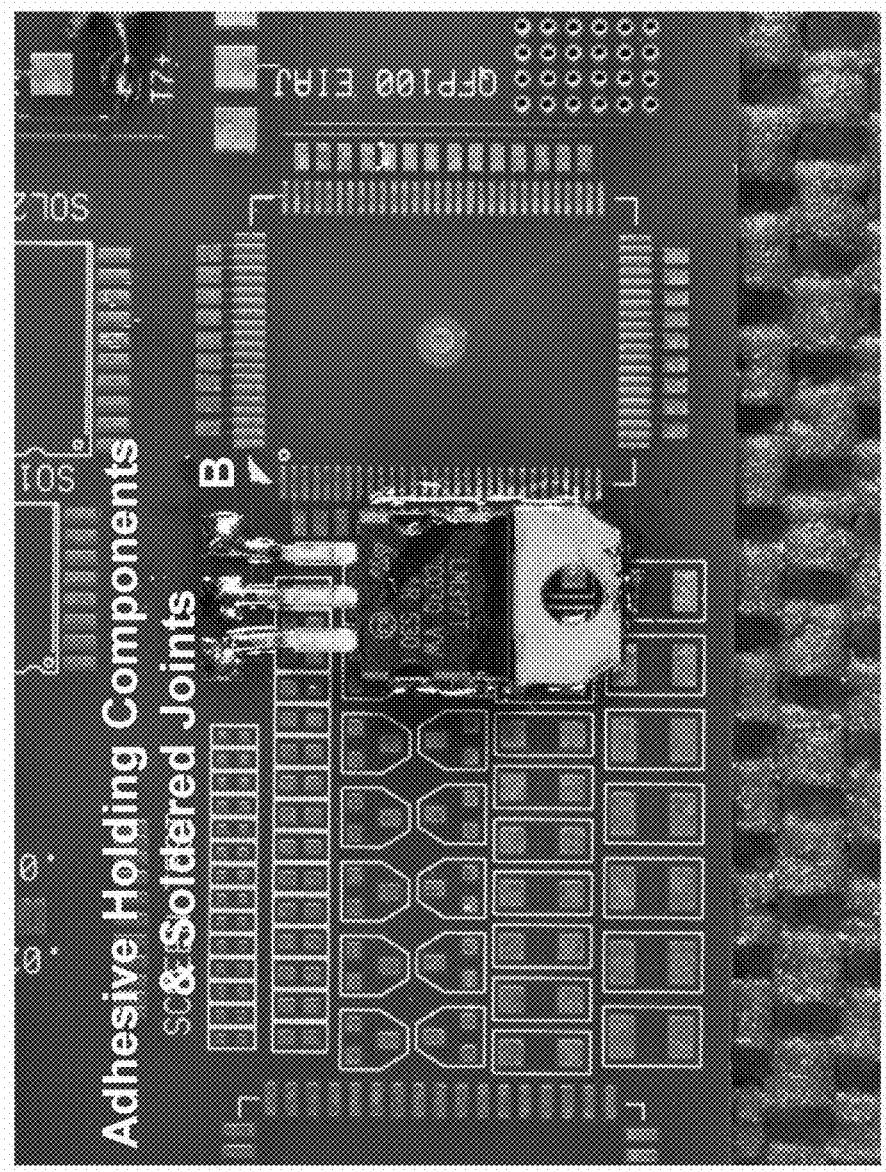
FIG. 13 is a close-up photograph of position B of FIG. 11 of a soldered gum rosin adhesive composition retaining a component on a printed wiring board, according to embodiments of the present invention.
Figure 14:
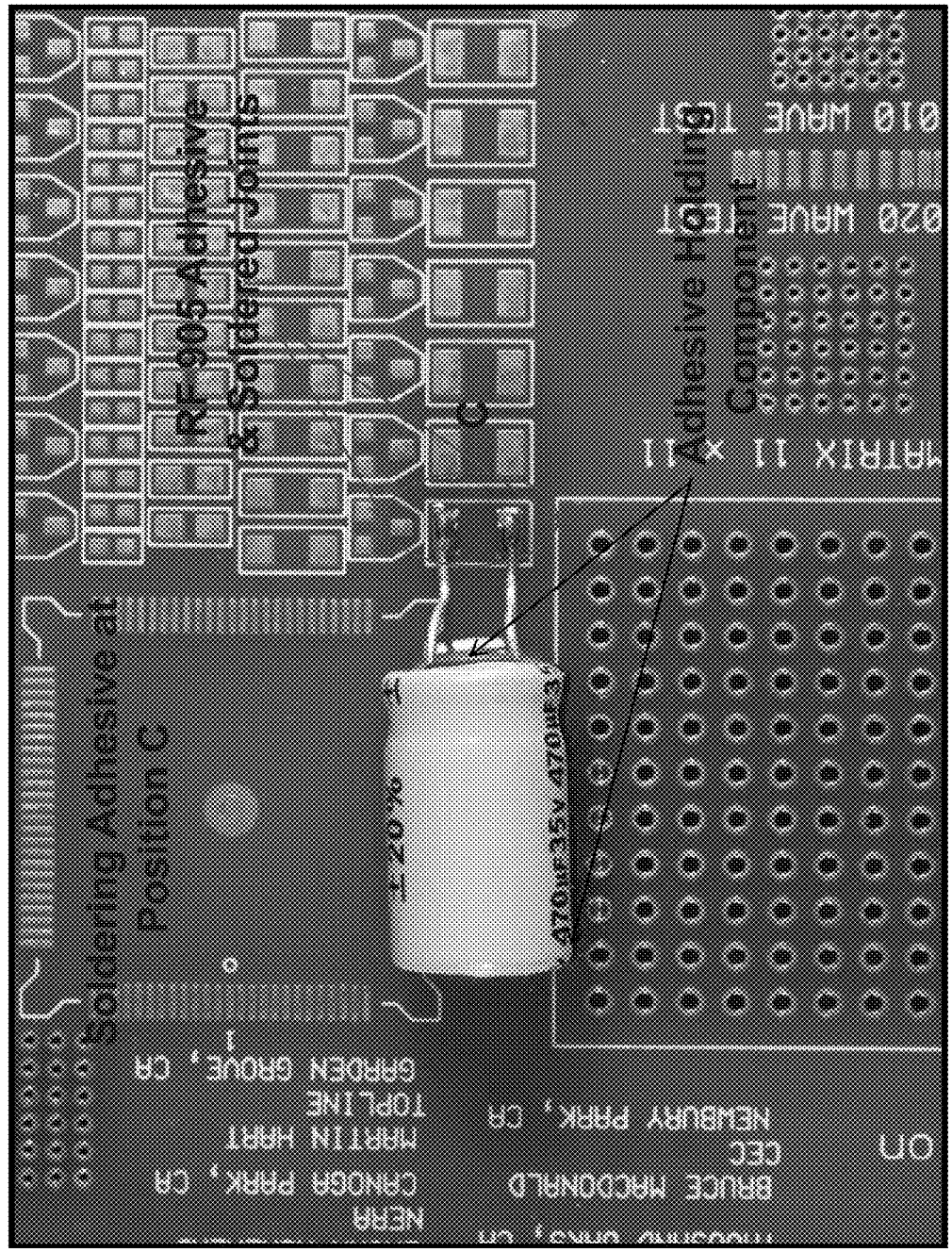
FIG. 14 is a close-up photograph of position C of FIG. 11 of a soldered gum rosin adhesive composition retaining a component on a printed wiring board, according to embodiments of the present invention.
Figure 15:
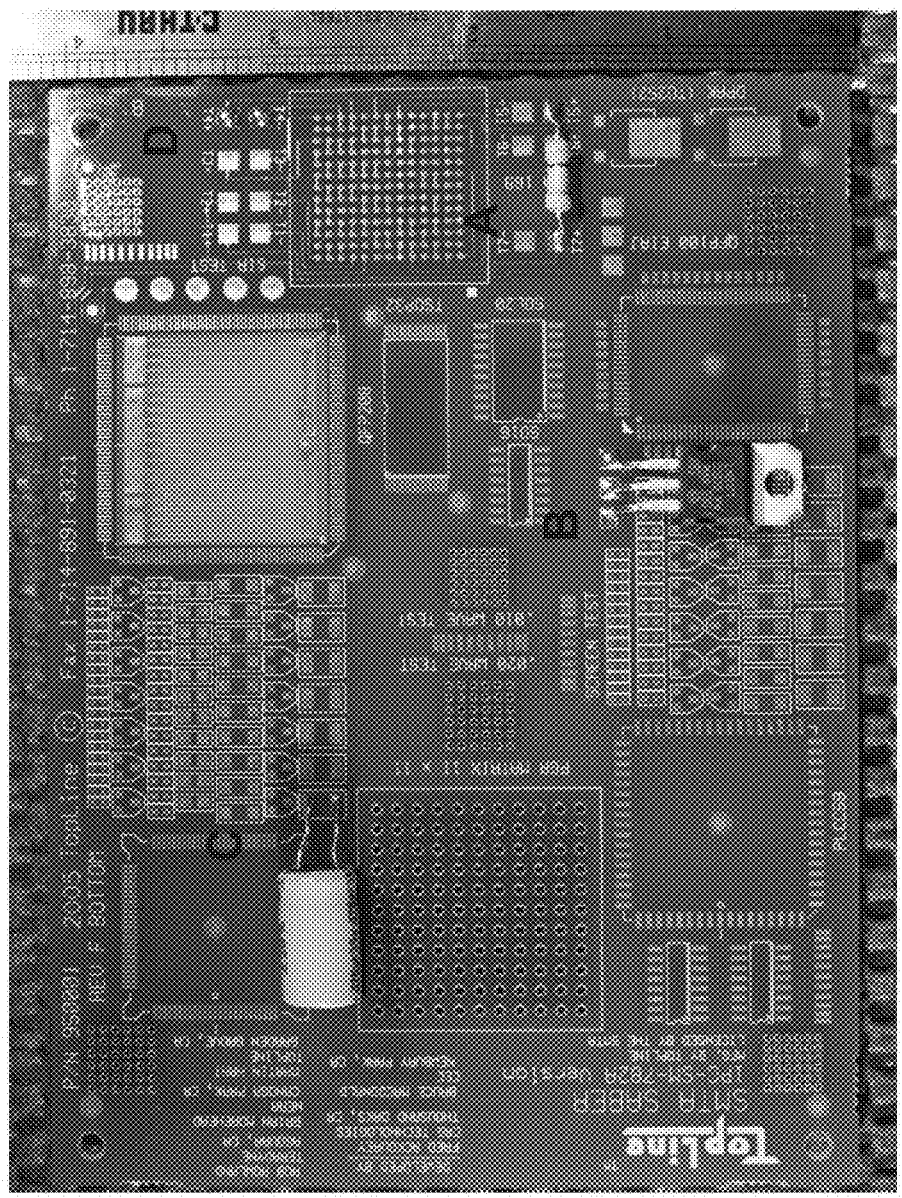
FIG. 15 is a photograph of soldered and cleaned gum rosin adhesive compositions retaining components on a printed wiring board at positions A, B, C, and D, according to embodiments of the present invention.

A printed wiring board (PWB) prior to application of the adhesive is shown in FIG. 4. The adhesive was placed into a dispensing tube and applied to the PWB at position A (FIG. 5), position B (FIG. 6), position C (FIG. 7), and position D (FIG. 8). FIGS. 9 and 10 show soldering of the adhesive at position D. FIG. 11 shows the PWB/CCA with adhered and soldered components prior to removal of the adhesive. FIG. 12 shows the adhesive holding the resistor at position A with soldered joints. FIG. 13 shows the adhesive holding the component at position B with soldered joint. FIG. 14 shows the adhesive holding the component at position C with soldered joint. FIG. 15 shows the PWB/CCA after cleaning of the adhesive with a 10% Kyzen 4615 (Kyzen Corp.) solution at 65 degrees ° C. The cleaned and soldered CCA was then rinsed with de-ionized water and dried at 60° C. (140 F) for a period of 2 hours.

As disclosed herein, and for example, as shown in FIGS. 10-15, a water white gum rosin adhesive composition according to embodiments of the present invention, is effective for the attachment of components prior to and during the soldering process. The water white gum rosin is a temporary adhesive to replace the commonly used permanent or replaceable adhesives. As shown herein in the Example and FIGS. 10-15, the temporary adhesive holds small components in place while reflow operations are completed. Since the adhesive is a flux, any intrusion onto the attachment pad will promote the solder joint formation. After the solder joint formation is completed, the adhesive remains and acts as a structural adhesive, or can be removed and replaced by a staking compound (i.e., an electrically nonconductive adhesive material).

While the present invention has been illustrated and described with reference to certain exemplary embodiments, those of ordinary skill in the art will understand that various modifications and changes may be made to the described embodiments without departing from the spirit and scope of the present invention, as defined in the following claims.

What is claimed is:

1. A rosin composition, comprising:
   a gum rosin;
   an emulsifier selected from the group consisting of trichloroethane, acetone isopropyl alcohol (IPA), IPA-water combination, toluene, benzene, 2-propanol (IPA), methyl ethyl ketone (MEK), toluene/acetone/methyl ethyl ketone (MEK) and IPA combination, 1,1-dichloroethane, isoamyl acetate, cellusolve acetate, acetone, xylene, 1,1,1,1-tetrachloromethane, 1,1,2,2-tetrachloroethene, 1,1,1-trichloroethane, 1,1,2-trichloroethane, 1,1-dichloroethane, 1,1-dichloroethene, 1,2-dichloroethane, 1,2,-dichloroethene, 1,1-dichloro-1-bromoethane, 1,1-dichloro-1-bromoethene, 1-bromo-1chloro-2-chloroethene, 1,1,1-tribromoethane, 1,1,2-tribromoethene, and combinations thereof;
   a randomizing additive selected from the group consisting of hydrocarbon oils, naturally occurring oils, glycerols, castor bean oil, corn oil, grape seed oil, olive oil, peanut oil, soybean oil, sunflower seed oil, walnut oil, glycerin, hemp oil, jojoba, lanolin, tea tree oil, wheat germ oil, polyethylene glycol, ethylene adipate, benzo-alkyl dio, and combinations thereof; and
   a bonding agent selected from the group consisting of polyvinyl acetate (PVAc), polyvinyl alcohol, hydrolytic non-stable binding resin and polymer systems having hydroxyl cleavable polymer structures, and organic solutions capable of solvating polymer systems.

2. The rosin composition of claim 1, wherein the gum rosin is a water white gum rosin.

3. The rosin composition of claim 1, wherein a ratio of the gum rosin to the emulsifier is 4 parts gum rosin to 1 part emulsifier.

4. The rosin composition of claim 1, wherein the randomizing additive is present in an amount ranging from 3% to 45% by weight.

5. The rosin composition of claim 1, wherein the randomizing additive is present in an amount of 10% by weight.

6. The rosin composition of claim 1, further comprising a filler.

7. The rosin composition of claim 1, further comprising a filler selected from the group consisting of hydrated sodium borate, boric acid, succinic acid, fumed silica, cut glass fiber, aluminum oxide, fine powdered ceramics, non-conductive carbon nanotubes (CNT), carbon geodesic balls, nut shell particles, ablative cork, ground nylon 66, a derivative of nylon 66, ground silica dioxide, potassium sulphate, and mixtures thereof.

8. A method of soldering components on a printed circuit board, the method comprising:
   applying the rosin composition of claim 1 on a substrate of a printed wiring board; and
   soldering at least one component to the substrate of the printed wiring board.

9. The method of claim 8, further comprising removing the rosin composition from the printed wiring board.

10. The method of claim 9, wherein removing the rosin composition from the printed wiring board comprises using a soap solution or an organic solvent.

11. The method of claim 10, wherein removing the rosin composition from the printed wiring board comprises using a detergent.

12. The method of claim 10, wherein removing the rosin composition from the printed wiring board comprises using an organic solvent selected from the group consisting of trichloroethane, acetone, toluene, benzene, isopropyl alcohol, tetrachlorofluoroethane, and combinations thereof.

13. A rosin composition, comprising:
   a gum rosin;
   a polyethylene glycol (PEG) having a molecular weight of 5,000 daltons or less in water;
   a randomizing additive selected from the group consisting of hydrocarbon oils, naturally occurring oils, glycerols, castor bean oil, corn oil, grape seed oil, olive oil, peanut oil, soybean oil, sunflower seed oil, walnut oil, glycerin, hemp oil, jojoba, lanolin, tea tree oil, wheat germ oil, polyethylene glycol, ethylene adipate, benzo-alkyl dio, and combinations thereof; and
   a bonding agent selected from the group consisting of polyvinyl acetate (PVAc), polyvinyl alcohol, hydrolytic non-stable binding resin and polymer systems having hydroxyl cleavable polymer structures, and organic solutions capable of solvating polymer systems.

14. The rosin composition of claim 13, wherein the gum rosin is a water white gum rosin.

15. The rosin composition of claim 13, wherein a ratio of the gum rosin to the emulsifier is 4 parts gum rosin to 1 part emulsifier.

16. The rosin composition of claim 13, wherein the randomizing additive is present in an amount ranging from 3% to 45% by weight.

17. The rosin composition of claim 13, wherein the randomizing additive is present in an amount of 10% by weight.

18. The rosin composition of claim 13, further comprising a filler.

19. The rosin composition of claim 13, further comprising a filler selected from the group consisting of hydrated sodium borate, boric acid, succinic acid, fumed silica, cut glass fiber, aluminum oxide, fine powdered ceramics, non-conductive carbon nanotubes (CNT), carbon geodesic balls, nut shell particles, ablative cork, ground nylon 66, a derivative of nylon 66, ground silica dioxide, potassium sulphate, and mixtures thereof.

20. A method of soldering components on a printed circuit board, the method comprising:
   applying the rosin composition of claim 13 on a substrate of a printed wiring board; and
   soldering at least one component to the substrate of the printed wiring board.

21. The method of claim 20, further comprising removing the rosin composition from the printed wiring board.

22. The method of claim 21, wherein removing the rosin composition from the printed wiring board comprises using a soap solution or an organic solvent.

23. The method of claim 21, wherein removing the rosin composition from the printed wiring board comprises using a detergent.

24. The method of claim 21, wherein removing the rosin composition from the printed wiring board comprises using an organic solvent selected from the group consisting of trichloroethane, acetone, toluene, benzene, isopropyl alcohol, tetrachlorofluoroethane, and combinations thereof.

25. A rosin composition, comprising:
   a gum rosin;
   a terpene-based emulsifier selected from the group consisting of hemiterpenes, monoterpenes, sesquiterpenes, diterpenes, sesterpenes, triterpenes, and phosphate-substituted isoprenes, and combinations thereof, organic sulfate compounds in water, and combinations thereof;
   a randomizing additive selected from the group consisting of hydrocarbon oils, naturally occurring oils, glycerols, castor bean oil, corn oil, grape seed oil, olive oil, peanut oil, soybean oil, sunflower seed oil, walnut oil, glycerin, hemp oil, jojoba, lanolin, tea tree oil, wheat germ oil, polyethylene glycol, ethylene adipate, benzo-alkyl dio, and combinations thereof; and
a bonding agent.

26. The rosin composition of claim 25, wherein the gum rosin is a water white gum rosin.

27. The rosin composition of claim 25, wherein a ratio of the gum rosin to the emulsifier is 4 parts gum rosin to 1 part emulsifier.

28. The rosin composition of claim 25, wherein the randomizing additive is present in an amount ranging from 3% to 45% by weight.

29. The rosin composition of claim 25, wherein the randomizing additive is present in an amount of 10% by weight.

30. The rosin composition of claim 25, wherein the bonding agent is selected from the group consisting of polyvinyl acetate (PVAc), polyvinyl alcohol, hydrolytic non-stable binding resin and polymer systems having hydroxyl cleavable polymer structures, and organic solutions capable of solvating polymer systems.

31. The rosin composition of claim 25, further comprising a filler.

32. The rosin composition of claim 25, further comprising a filler selected from the group consisting of hydrated sodium borate, boric acid, succinic acid, fumed silica, cut glass fiber, aluminum oxide, fine powdered ceramics, non-conductive carbon nanotubes (CNT), carbon geodesic balls, nut shell particles, ablative cork, ground nylon 66, a derivative of nylon 66, ground silica dioxide, potassium sulphate, and mixtures thereof.

33. A method of soldering components on a printed circuit board, the method comprising:
applying the rosin composition of claim 25 on a substrate of a printed wiring board; and
soldering at least one component to the substrate of the printed wiring board.

34. The method of claim 33, further comprising removing the rosin composition from the printed wiring board.

35. The method of claim 34, wherein removing the rosin composition from the printed wiring board comprises using a soap solution or an organic solvent.

36. The method of claim 34, wherein removing the rosin composition from the printed wiring board comprises using a detergent.

37. The method of claim 34, wherein removing the rosin composition from the printed wiring board comprises using an organic solvent selected from the group consisting of trichloroethane, acetone, toluene, benzene, isopropyl alcohol, tetrachlorofluoroethane, and combinations thereof.

38. A rosin composition, comprising:
a gum rosin;
an emulsifier;
a randomizing additive selected from the group consisting of hydrocarbon oils, naturally occurring oils, glycerols, castor bean oil, corn oil, grape seed oil, olive oil, peanut oil, soybean oil, sunflower seed oil, walnut oil, glycerin, hemp oil, jojoba, lanolin, tea tree oil, wheat germ oil, polyethylene glycol, ethylene adipate, benzo-alkyl dio, and combinations thereof; and
a bonding agent, the gum rosin, the emulsifier and the randomizing additive being mixed with the bonding agent in an amount of 1 to 3 parts of the gum rosin, the emulsifier and the randomizing additive to 3 to 6 parts of the bonding agent.

39. The rosin composition of claim 38, wherein the gum rosin is a water white gum rosin.

40. The rosin composition of claim 38, wherein a ratio of the gum rosin to the emulsifier is 4 parts gum rosin to 1 part emulsifier.

41. The rosin composition of claim 38, wherein the emulsifier is selected from the group consisting of trichloroethane, acetone isopropyl alcohol (PA), IPA-water combination, toluene, benzene, 2-propanol (IPA), methyl ethyl ketone (MEK), toluene/acetone/methyl ethyl ketone (MEK) and IPA combination, 1,1-dichloroethane, isoamyl acetate, cellusolve acetate, acetone, xylene, 1,1,1,1-tetrachloromethane, 1,1,2,2-tetrachloroethene, 1,1,1-trichloroethane, 1,1,2-trichloroethane, 1,1-dichloroethane, 1,1-dichloroethene, 1,2-dichloroethane, 1,2,-dichloroethene, 1,1-dichloro-1-bromoethane, 1,1-dichloro-1-bromoethene, 1-bromo-1 chloro-2-chloroethene, 1,1,1-tribromoethane, 1,1,2-tribromoethene, and combinations thereof.

42. The rosin composition of claim 38, wherein the emulsifier is selected from the group consisting of ethylene glycols in water, diethylene glycols in water, polyethylene glycols (PEG) in water, polyethylene diglycols, terpene-based organic compounds, organic sulfate compounds in water, and combinations thereof.

43. The rosin composition of claim 42, wherein the PEG in water has a molecular weight of 5,000 daltons or less.

44. The rosin composition of claim 42, wherein the terpene-based organic compound is selected from the group consisting of hemiterpenes, monoterpenes, sesquiterpenes, diterpenes, sesterpenes, triterpenes, and phosphate-substituted isoprenes, and combinations thereof.

45. The rosin composition of claim 38, wherein the randomizing additive is present in an amount ranging from 3% to 45% by weight.

46. The rosin composition of claim 38, wherein the randomizing additive is present in an amount of 10% by weight.

47. The rosin composition of claim 38, wherein the bonding agent is selected from the group consisting of polyvinyl acetate (PVAc), polyvinyl alcohol, hydrolytic non-stable binding resin and polymer systems having hydroxyl cleavable polymer structures, and organic solutions capable of solvating polymer systems.

48. The rosin composition of claim 38, further comprising a filler.

49. The rosin composition of claim 38, further comprising a filler selected from the group consisting of hydrated sodium borate, boric acid, succinic acid, fumed silica, cut glass fiber, aluminum oxide, fine powdered ceramics, non-conductive carbon nanotubes (CNT), carbon geodesic balls, nut shell particles, ablative cork, ground nylon 66, a derivative of nylon 66, ground silica dioxide, potassium sulphate, and mixtures thereof.

50. A method of soldering components on a printed circuit board, the method comprising:
applying the rosin composition of claim 38 on a substrate of a printed wiring board; and
soldering at least one component to the substrate of the printed wiring board.

51. The method of claim 50, further comprising removing the rosin composition from the printed wiring board.

52. The method of claim 51, wherein removing the rosin composition from the printed wiring board comprises using a soap solution or an organic solvent.

53. The method of claim 51, wherein removing the rosin composition from the printed wiring board comprises using a detergent.

54. The method of claim 51, wherein removing the rosin composition from the printed wiring board comprises using an organic solvent selected from the group consisting of trichloroethane, acetone, toluene, benzene, isopropyl alcohol, tetrachlorofluoroethane, and combinations thereof.

* * * * *